(12) United States Patent
Chikazawa et al.

(10) Patent No.: US 6,655,949 B2
(45) Date of Patent: Dec. 2, 2003

(54) CLAMPING APPARATUS FOR INJECTION MOLDING MACHINE

(75) Inventors: Motonori Chikazawa, Aichi (JP); Shizuo Jinno, Aichi (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 217 days.

(21) Appl. No.: 09/967,957

(22) Filed: Oct. 2, 2001

(65) Prior Publication Data

US 2002/0041915 A1 Apr. 11, 2002

(30) Foreign Application Priority Data

Oct. 2, 2000 (JP) ........................................ 2000-302457

(51) Int. Cl.[7] ............................................... B29C 45/64
(52) U.S. Cl. ...................... 425/190; 425/556; 425/595
(58) Field of Search ................................ 425/190, 556, 425/589, 590, 595

(56) References Cited

U.S. PATENT DOCUMENTS 5,744,177 A * 4/1998 Lin ............................ 425/595
5,863,474 A * 1/1999 Ito et al. ..................... 425/595

OTHER PUBLICATIONS

Ito Katsuo et al. Patent Abstracts of Japan "Locking Apparatus of Horizontal Injection Molding Machine" Publication No. 08–174613 date of publication Jul. 9, 1996.

* cited by examiner

Primary Examiner—James P. Mackey
(74) Attorney, Agent, or Firm—Browdy and Neimark, P.L.L.C.

(57) ABSTRACT

A clamping apparatus 30 has a driving plate 31 provided with a securing device 40 for securing tie rods 13 in a predetermined position in the axial direction, and a clamping drive device 50 for pressing a movable platen 12. The driving plate 31 is guided by guide bars 15, secured to the movable platen 12, in the axial direction. Rear parts of the guide bars 15 are secured to an adjusting plate 32 which is provided with a positioning means 60 for adjusting and holding a distance S between the driving plate 31 and the movable platen 12.

5 Claims, 4 Drawing Sheets

CLAMPING APPARATUS FOR INJECTION MOLDING MACHINE

BACKGROUND OF THE INVENTION

1. Field of the Invention

This invention relates to a clamping apparatus for an injection molding machine and, especially, to a clamping apparatus provided on a movable platen which is moved reciprocally, along tie rods, by a die opening and closing device.

2. Description of the Prior Art

As disclosed in Kokai (Jpn. unexamined patent publication) No. 8-174613, there is a known injection molding machine in which a movable platen is moved reciprocally, along tie rods, by a die opening and closing device provided on a stationary platen. A clamping apparatus is provided on the movable platen. In the prior art, the movable platen and a clamping drive member (cylinder device) are located on the same base so as to prevent the movable platen and the clamping drive member from moving independently during the opening and closing of the die and the clamping operation.

However, in the prior art, even though the movable platen and the clamping drive member are located on the same base, they do not necessarily move together synchronously and a deviation of the center positions thereof or an inclination thereof can often occur because the movable platen and the clamping drive member are moved along the tie rods and due to inertia.

Further, in the prior art, there is a problem that, when the thickness of the die is changed, an adjustment of the distance between the clamping drive member and the movable platen is complicated and it is necessary to adjust the distance therebetween on the base.

SUMMARY OF THE INVENTION

In view of the above-mentioned problem, the present invention is aimed at provision of a structure of a clamping apparatus for an injection molding machine in which no deviation of the center positions of the movable platen and the clamping drive member or no inclination of the both occurs and the distance therebetween can be easily adjusted and held.

Namely, in the invention claimed in Claim 1, there is provided a clamping apparatus for an injection molding machine, in which a movable platen is moved reciprocally, along tie rods, by a die opening and closing device, said movable platen being provided with a clamping apparatus for clamping, a driving plate provided with a securing device for securing the tie rods in a predetermined position in the axial direction, and a clamping drive device for pressing the movable platen, said driving plate being guided by guide bars, secured to said movable platen, in the axial direction, rear parts of said guide bars being secured to an adjusting plate which is provided with a positioning means for adjusting and holding a distance between said driving plate and said movable platen.

The invention claimed in Claim 2 provides a clamping apparatus for an injection molding machine as set forth in Claim 1, wherein said positioning means comprises a ball-screw provided on said driving plate, a ball nut provided on said adjusting plate and engageable with said ball-screw, and a servomotor for rotating said ball-screw.

In the invention claimed in Claim 3 or 4, a plurality of clamping drive devices are provided for a pressing surface of said movable platen.

According to the invention claimed in Claim 5, a clamping apparatus for an injection molding machine further comprises an ejector device having an ejector plate provided with ejector pins projecting therefrom and guided by said guide bars in the axial direction.

DESCRIPTION OF THE PREFERRED EMBODIMENTS

Figure 1:
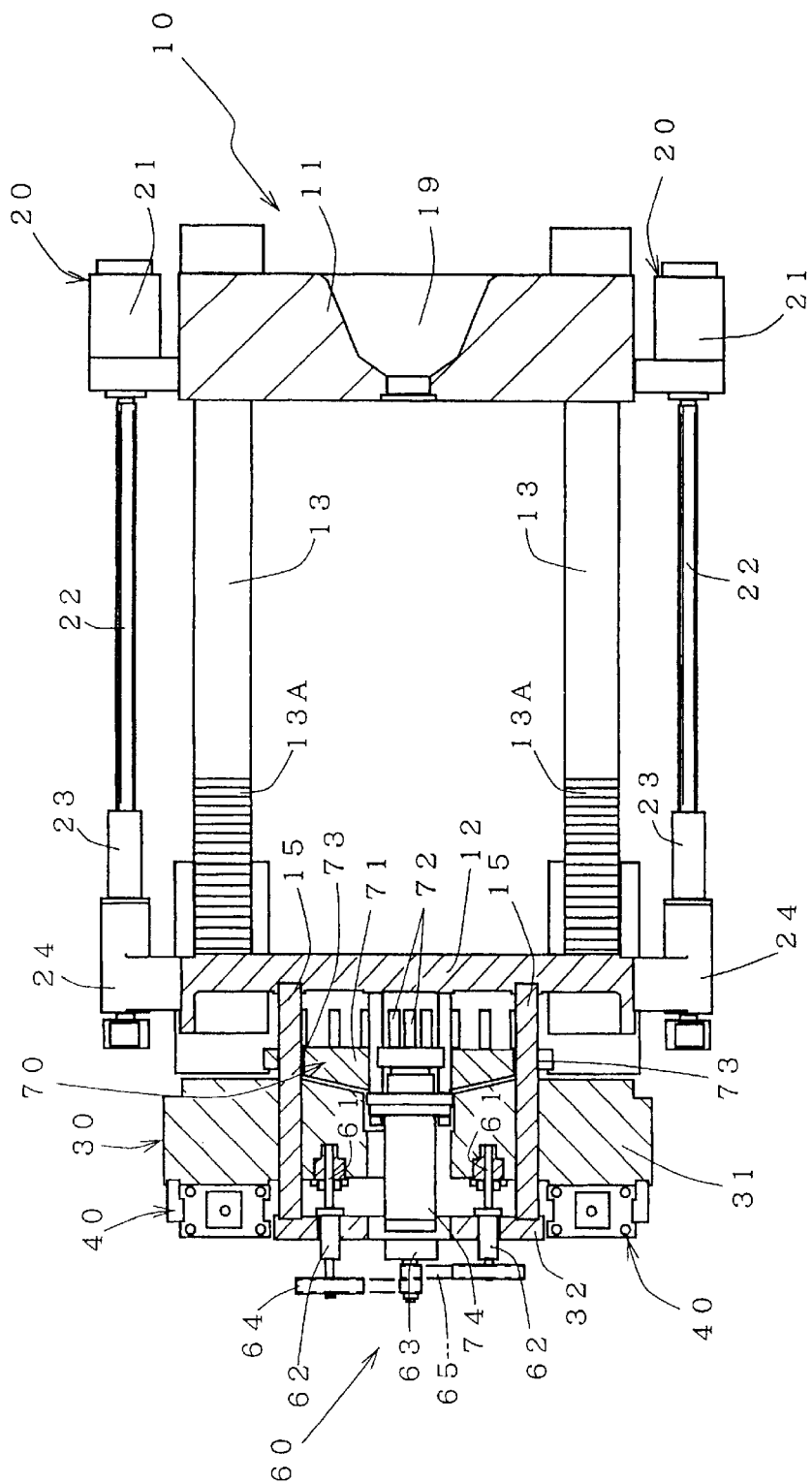
FIG. 1 is a plan view of a main part of an injection molding machine, in which a clamping machine is partially sectioned, according to an embodiment of the present invention.
Figure 2:
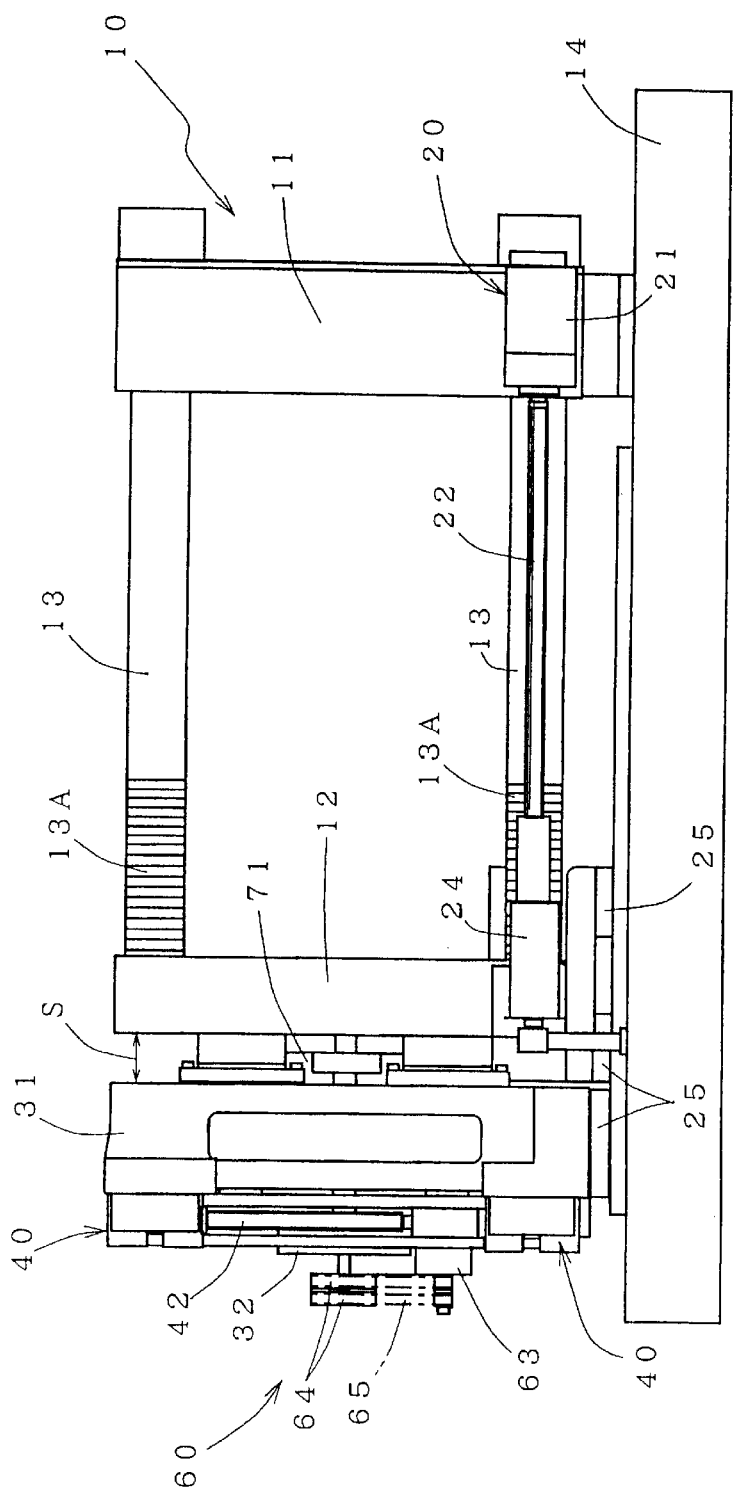
FIG. 2 is a side view of FIG. 1.

The invention will be explained below with reference to the drawings. As shown in the drawing, in an injection molding machine 10, the present invention is applied to a clamping apparatus 30 provided on a movable platen 12 which is moved reciprocally along tie rods 13 by die opening and closing devices 20. In the drawings, numeral 11 designates a stationary platen, 14 a base, 19 a nozzle inserting portion of an injection device (not shown), 21 die opening and closing servomotors of the die opening and closing devices 20 secured to the stationary platen 11, 22 ball screws, 23 ball nuts, 24 a bracket of the movable platen 12, and 25 guide shoes of a linear sliding member. Though the servomotors 21 of the die opening and closing devices 20 provided on the stationary platen 11 are shown in the drawings by way of example, cylinder devices per se known can be also used as the drivers and the drivers can be attached to the movable platen 12 or a driving plate 31 which will be discussed hereinafter.

The clamping apparatus 30 according to the invention includes the driving plate 31 and an adjusting plate 32. The driving plate 31 is provided with securing devices 40 for securing the tie rods 13 in a predetermined position in its axial direction, and clamping drive devices 50 for pressing the movable platen 12. A plurality of guide bars 15 attached to a rear portion of the movable platen 12 guide the movement of the driving plate 31 in the axial directions. In the embodiment, there are two guide bars 15 in parallel on each of the right and left sides of the movable platen 12. As a matter of course, the guide bars 15 extend in parallel in the horizontal direction.

The securing devices 40 are each made of a conventional half-nut mechanism. As can be seem from FIG. 3, for each of threaded parts 13A of the four upper, lower, left and right tie rods 13, a pair of upper and lower half-split type half nut portions 41 (41A, 41B) are simultaneously opened and closed for holding and releasing by the corresponding threaded portions by two right and left cylinder devices 42.

The clamping drive devices 50 in the embodiment are each comprised of a cylinder device per se known. More than one (four shown in FIG. 3) clamping drive device 50 are provided on the pressing surface of the movable platen 12 as specified in Claim 3 or 4. With the arrangement of the multiple clamping drive devices (cylinder devices) 50, it is possible to apply the clamping force over the entire pressing surface of the movable platen 12 more uniformly than using a single clamping drive device, and to effectively utilize the space behind the driving plate 31 and the movable platen 12, so that the placement of the guide bars 15 or an ejector device 70, etc., which will be described hereinafter, can be facilitated.

Figure 4:
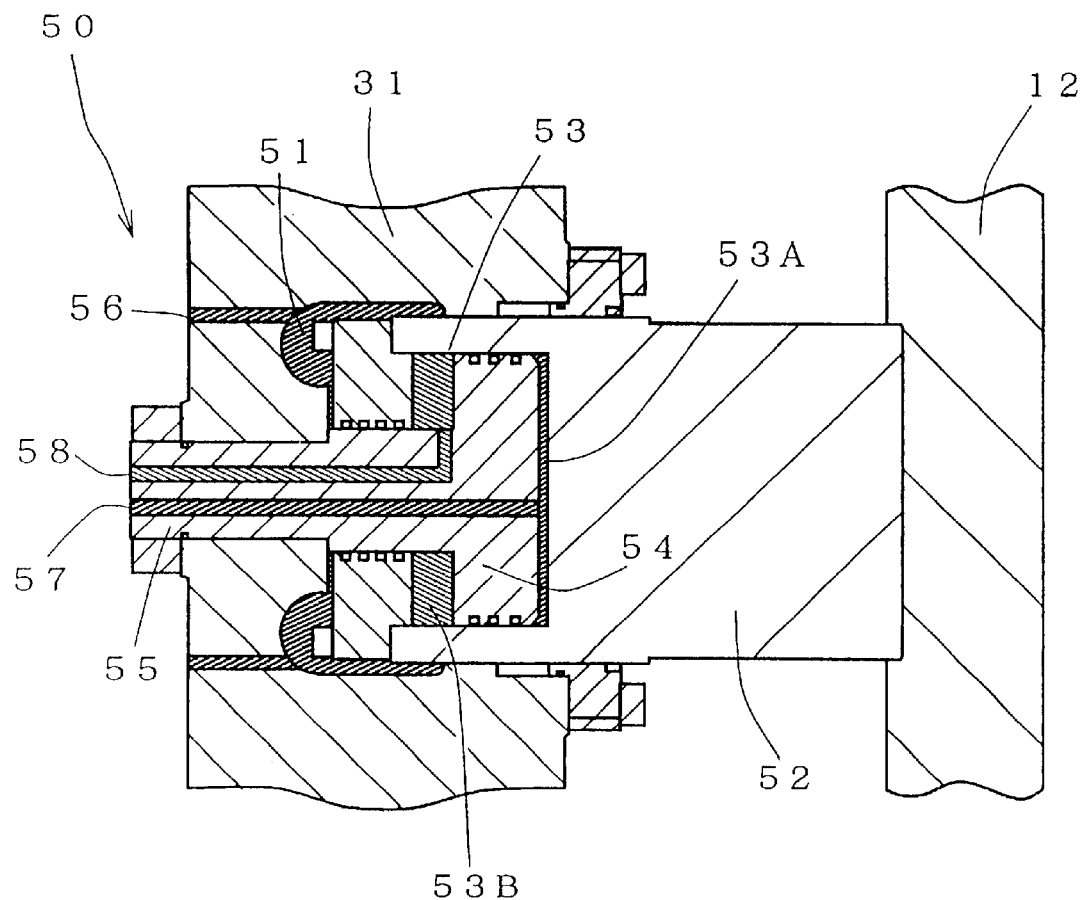
FIG. 4 is a sectional view of a main part of an embodiment of a clamping drive device.

The clamping drive devices 50 in the embodiment will be explained below. As shown in FIG. 4, each cylinder device is of a so-called tandem cylinder device having two cylinder chambers (first cylinder chamber 51 and second cylinder chamber 53) and two pistons (first piston 52 and second piston 54). The first cylinder chamber 51 is provided in the driving plate 31, and the first piston 52 connected to the rear portion of the movable platen 12 is reciprocally movably inserted in the first cylinder chamber 51. Numeral 56 represents an inlet/outlet passage of working oil into/from the first cylinder chamber 51 provided in the driving plate 31. The second cylinder chamber 53 is formed in the first piston 52, and the second piston 54 is secured to the driving plate 31. The rear shaft portion 55 of the second piston 54 is inserted in the driving plate 31. An inlet/outlet passage 57 of the working oil into/from a front chamber part 53A of the second cylinder chamber 53 is formed and extends through the rear shaft portion 55 and the second piston 54. An inlet/outlet passage 58 of the working oil into/from the rear chamber part 53B of the second cylinder chamber 53 is formed through the rear shaft portion 55.

In the clamping drive devices 50, when clamping, the working oil is introduced into the inlet/outlet passages 56 and 57 to produce force equal to the pressure multiplied by the sum of cross-sectional areas of the first and second pistons 52 and 54, so that large clamping force can be obtained by a small device. When opening, the working oil is introduced into the inlet/outlet passage 58 to move the first piston 52 and the movable platen 12 backward, so that large die opening force can be also obtained.

Next, the adjusting plate 32 will be explained below. The adjusting plate 32 is immovably connected to the rear ends of the guide bars 15. The adjusting plate 32 is provided with a positioning means 60 for positioning and holding the distance S between the driving plate 31 and the movable platen 12. As a matter of course, the distance S is such that the half nut portions 41 (41A and 41B) of the securing devices 40 can engage with and lock the threaded parts 13A of the tie rods 13. The distance S between the driving plate 31 and the movable platen 12 is varied, depending on the thickness of the die, as described above, and to this end, the distance S can be easily varied, adjusted and held by the positioning means 60.

Figure 3:
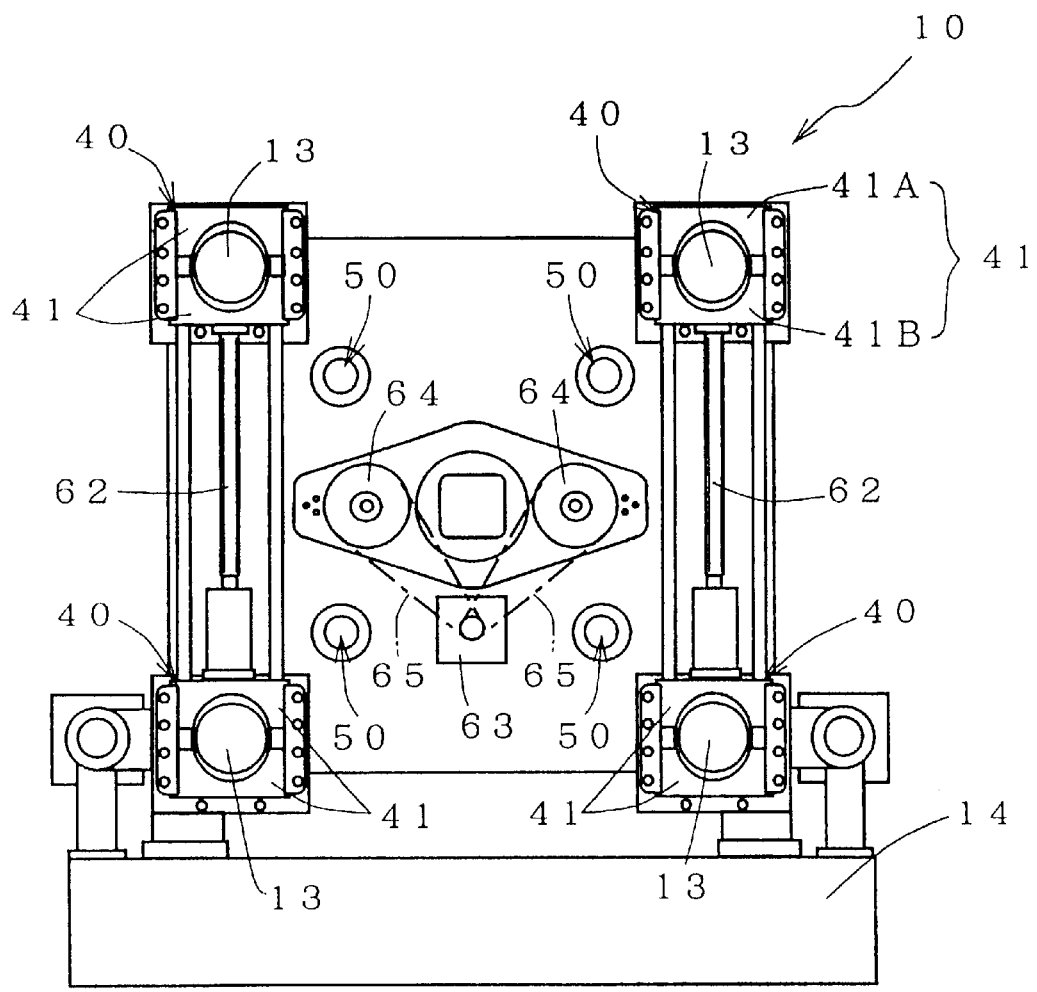
FIG. 3 is a back view of FIG. 1.

The positioning means 60 shown in the drawings is comprised of ball-screws 61 provided on the movable plate 31, ball nuts 62 provided on the adjusting plate 32 and engageable with the ball-screws 61, and servomotors 63 for rotating the ball-screws 61, as defined in Claim 2. In FIG. 3, Numeral 64 represents pulleys for rotating the ball-screws 61 and Numeral 65 represents a transmission belt. The driving plate 31 is moved back and forth in the axial direction of the guide bars 15 in accordance with the operation of the servomotor 63 drives, so that the distance S between the driving plate 31 and the movable platen 12 can be adjusted. After positioning, the distance S is held by locking the servomotor 63.

As shown in FIG. 1, and defined in claim 5, an ejector device 70 having an ejector plate 71 provided with ejector pins 72 projecting therefrom in which the ejector plate 71 is guided in the axis direction by the guide bars 15. Numeral 73 represents guide holes through which the guide bars 15 extend and numeral 74 represents a cylinder device for driving the ejector. With this construction, it is possible to ensure the centering of the ejector device 70.

As explained above and as shown in the drawings, according to the present invention, the driving plate, provided with the securing devices for securing the tie rods in a predetermined axial position and the clamping drive devices for pressing the movable platen, is guided by the guide bars secured to the movable platen, in the axial direction, so that the deviation of the center positions between the movable platen and the clamping drive members or an inclination thereof can be prevented. Moreover, since the adjusting plate to which the rear parts of the guide bars are secured is provided with the positioning means for adjusting and holding the distance between the driving plate and the movable platen, the distance therebetween can be easily adjusted and held.

According to the invention claimed in Claim 2, the positioning means is comprised of ball-screws provided on the movable plate, ball nuts, provided on the adjusting plate and engaged with the ball-screws and a servomotor for rotating the ball-screws, and hence, the distance between the driving plate and the movable platen can be more easily adjusted and held.

According to the invention claimed in Claim 3 or 4, since the multiple clamping drive devices are provided on the pressing surface of the movable platen, it is possible to exert the clamping force on the overall pressing surface of the movable platen more widely and uniformly than by using a single clamping drive device, and to make effective utilization of the space behind the driving plate and the movable platen, and thus resulting in easy placement of the guide bars or the ejector device, etc.

According to the invention claimed in Claim 5, since the ejector plate, provided with the ejector pins projecting therefrom, of the ejector device, is guided by the guide bars in the axial direction, the centering of the ejector pins can be carried out without using a special mechanism or members.

What is claimed is:

1. A clamping apparatus for an injection molding machine, in which a movable platen is moved reciprocally along tie rods by a die opening and closing device, said movable platen being provided with a clamping apparatus for clamping, a driving plate provided with a securing device for securing the tie rods in a predetermined position in the axial direction, and a clamping drive device for pressing the movable platen, said driving plate being guided by guide bars, secured to said movable platen, in the axial direction, rear parts of said guide bars being secured to an adjusting plate which is provided with a positioning means for adjusting and holding a distance between said driving plate and said movable platen.

2. A clamping apparatus for an injection molding machine as set forth in claim 1, wherein said positioning means comprises a ball-screw provided on said driving plate, a ball nut provided on said adjusting plate and engageable with said ball-screw, and a servomotor for rotating said ball-screw.

3. A clamping apparatus for an injection molding machine as set forth in claim 1, wherein a plurality of clamping drive devices are provided for a pressing surface of said movable platen.

4. A clamping apparatus for an injection molding machine as set forth in claim 2, wherein a plurality of clamping drive devices are provided for a pressing surface of said movable platen.

5. A clamping apparatus for an injection molding machine, as set forth in any one of claim 1 through claim 4, further comprising an ejector device having an ejector plate provided with ejector pins projecting therefrom and guided by said guide bars in the axial direction.

* * * * *